US011752500B2

(12) United States Patent
Fang et al.

(10) Patent No.: US 11,752,500 B2
(45) Date of Patent: Sep. 12, 2023

(54) MICROFLUIDIC DEVICES AND METHODS FOR MANUFACTURING MICROFLUIDIC DEVICES

(71) Applicant: CORNING INCORPORATED, Corning, NY (US)

(72) Inventors: Ye Fang, Painted Post, NY (US); Jin Su Kim, Seoul (KR); Aize Li, Painted Post, NY (US)

(73) Assignee: CORNING INCORPORATED, Corning, NY (US)

(*) Notice: Subject to any disclaimer, the term of this patent is extended or adjusted under 35 U.S.C. 154(b) by 274 days.

(21) Appl. No.: 17/049,676

(22) PCT Filed: Apr. 23, 2019

(86) PCT No.: PCT/US2019/028633
§ 371 (c)(1),
(2) Date: Oct. 22, 2020

(87) PCT Pub. No.: WO2019/209776
PCT Pub. Date: Oct. 31, 2019

(65) Prior Publication Data
US 2021/0069710 A1    Mar. 11, 2021

Related U.S. Application Data

(60) Provisional application No. 62/664,000, filed on Apr. 27, 2018.

(51) Int. Cl.
*B01L 3/00* (2006.01)
(52) U.S. Cl.
CPC ... *B01L 3/502715* (2013.01); *B01L 3/502707* (2013.01); *B01L 2200/027* (2013.01);
(Continued)

(58) Field of Classification Search
CPC ......... B01L 3/502715; B01L 3/502707; B01L 2200/027; B01L 2200/12; B01L 2300/161; B01L 2300/168; B01L 2300/12
See application file for complete search history.

(56) References Cited

U.S. PATENT DOCUMENTS 3,544,287 A    12/1970 Sharp
4,055,458 A *  10/1977 Niederprum ............ C03C 15/00
                                                        252/79.3
(Continued)

FOREIGN PATENT DOCUMENTS

CN    100491537 C    5/2009
CN    101636345 A    1/2010
(Continued)

OTHER PUBLICATIONS

John C, Lindon, Encyclopedia of Spectroscopy and spectrometry, Dec. 15, 2016, Academic Press, 3rd edition, p. 627 (Year: 2017).*
(Continued)

*Primary Examiner* — Jill A Warden
*Assistant Examiner* — Alex Ramirez (57) ABSTRACT

A method for manufacturing a microfluidic device (100) includes depositing a bonding layer (106) on a surface of a second glass layer (104a) of a glass substrate having a first glass layer (102) and the second glass layer (104a) fused to the first glass layer (102), such that a masked region of the surface is covered by the bonding layer, and an exposed region of the surface is uncovered by the bonding layer; removing a portion of the second glass layer corresponding to the exposed region of the surface to form a flow channel (112) in the glass substrate; and bonding a cover (108) to the glass substrate with the bonding layer (106).

11 Claims, 6 Drawing Sheets

(52) U.S. Cl.
CPC ....... *B01L 2200/12* (2013.01); *B01L 2300/12* (2013.01); *B01L 2300/161* (2013.01); *B01L 2300/168* (2013.01)

(56) References Cited

U.S. PATENT DOCUMENTS

| | | | |
|---|---|---|---|
| 4,130,680 | A | 12/1978 | Ference et al. |
| 4,214,886 | A | 7/1980 | Shay et al. |
| 6,258,263 | B1 | 7/2001 | Henderson et al. |
| 6,581,441 | B1 | 6/2003 | Paul |
| 6,599,436 | B1 | 7/2003 | Matzke et al. |
| 6,857,449 | B1 | 2/2005 | Chow |
| 7,238,323 | B2 | 7/2007 | Knapp et al. |
| 8,173,080 | B2 | 5/2012 | Lebl et al. |
| 8,241,573 | B2 | 8/2012 | Banerjee et al. |
| 9,120,287 | B2 | 9/2015 | Ruben et al. |
| 9,340,451 | B2 | 5/2016 | Boek et al. |
| 9,415,368 | B2 | 8/2016 | Sabot et al. |
| 9,492,990 | B2 | 11/2016 | Karam et al. |
| 9,515,286 | B2 | 12/2016 | Dabich et al. |
| 9,796,616 | B2 | 10/2017 | Coppola et al. |
| 2001/0036672 | A1 | 11/2001 | Anderson et al. |
| 2003/0226604 | A1 | 12/2003 | Schlautmann et al. |
| 2004/0115838 | A1 | 6/2004 | Quake et al. |
| 2005/0241815 | A1 | 11/2005 | Caze et al. |
| 2006/0018795 | A1 | 1/2006 | Potyrailo et al. |
| 2006/0215155 | A1 | 9/2006 | Weber |
| 2007/0072330 | A1 | 3/2007 | Popa et al. |
| 2007/0102293 | A1 | 5/2007 | Tai et al. |
| 2008/0230951 | A1 | 9/2008 | Dannoux et al. |
| 2009/0059222 | A1 | 3/2009 | Tan et al. |
| 2010/0043494 | A1 | 2/2010 | Gascon et al. |
| 2010/0178214 | A1 | 7/2010 | Marques et al. |
| 2011/0072914 | A1 | 3/2011 | Lebl et al. |
| 2011/0312049 | A1 | 12/2011 | Osterhout et al. |
| 2015/0346199 | A1* | 12/2015 | Li .................. B01L 3/5027 435/7.1 |
| 2015/0352511 | A1* | 12/2015 | Takebayashi .... G01N 33/54366 506/40 |
| 2016/0023208 | A1* | 1/2016 | Fisher ................ B29C 65/1467 156/272.8 |
| 2017/0075039 | A1 | 3/2017 | Hart et al. |
| 2017/0361574 | A1 | 12/2017 | Kiczenski et al. |
| 2018/0085752 | A1 | 3/2018 | Han et al. |
| 2018/0162768 | A1 | 6/2018 | Boek et al. |
| 2018/0246089 | A1* | 8/2018 | Chou .................. G16B 50/00 |
| 2018/0312425 | A1 | 11/2018 | Ashton-Patton et al. |

FOREIGN PATENT DOCUMENTS

| | | | | |
|---|---|---|---|---|
| CN | 101668711 | A | 3/2010 | |
| CN | 101687693 | A | 3/2010 | |
| CN | 107207310 | A | 9/2017 | |
| CN | 107735697 | A | 2/2018 | |
| CN | 107922243 | A | 4/2018 | |
| CN | 108139058 | A | 6/2018 | |
| CN | 108349783 | A | 7/2018 | |
| EP | 1816490 | A1 | 8/2007 | |
| EP | 1991890 | A1 | 11/2008 | |
| EP | 2596706 | A1 | 5/2013 | |
| GB | 2315266 | A | 1/1998 | |
| JP | 06-160218 | A | 6/1994 | |
| JP | 2000-178036 | A | 6/2000 | |
| JP | 2006-225198 | A | 8/2006 | |
| JP | 2006225198 | A * | 8/2006 | |
| TW | 200615228 | A | 5/2006 | |
| WO | 2003/035386 | A1 | 5/2003 | |
| WO | 2007/088453 | A1 | 8/2007 | |
| WO | 2007/123744 | A2 | 11/2007 | |
| WO | 2008/124064 | A1 | 10/2008 | |
| WO | 2010/054347 | A1 | 5/2010 | |
| WO | 2015/138660 | A1 | 9/2015 | |
| WO | WO-2015138660 | A1 * | 9/2015 | ............. B32B 17/06 |
| WO | 2016/196615 | A1 | 12/2016 | |
| WO | WO-2016196615 | A1 * | 12/2016 | ............. B32B 17/06 |
| WO | 2017/070500 | A1 | 4/2017 | |
| WO | 2020/033183 | A1 | 2/2020 | |

OTHER PUBLICATIONS

Himanshu et al: 57 .4: The Effect of the Roughness of the Glass Substrate on the Roughness of the Barrier Layer Used During Fabrication of Poly-Si TFTs , 2003 SID International Symposium—May 20, Baltimore, Maryland, vol. XXXIV, May 20, 2003 (May 20, 2003), p. 1516.

International Search Report and Written Opinion of the International Searching Authority; PCT/US2019/028633 dated Sep. 6, 2019, 20 pages; European Patent Office.

Goodwin et al., "Coming of Age: Ten Years of Next Generation Sequencing Technologies", Nature Reviews, vol. 17, Jun. 2016, pp. 333-351.

Iiliescu et al., "A Practical Guide For The Fabrication of Microfluidic Devices Using Glass and Silicon", Biomicrofluidics, Mar. 2012, vol. 6, No. 1, pp. 16505-1650516.

International Search Report and Written Opinion of the International Searching Authority; PCT/US19/44012; dated Nov. 14, 2019; 10 Pages; European Patent Office.

Abdelsalam, Dahi Ghareab, et al., "Interferometry and its Applications in Surface Metrology", Optical Interferometry, Feb. 15, 2017, Chapters, pp. 81-102, 22 pages, Intechopen, United Kingdom.

ZYGO Corporation, "ZYGO's Guide to Typical Interferometer Setups", 2001, 12 pages.

ZYGO Corporation, "Topography & Texture", 2022, available at: https://zygo.com/applications/measurements/topograph-texture, downloaded Mar. 13, 2023, 3 pages.

Alluxa, Inc., "Surface Flatness and Wavefront Error", 2021, available at: https://www.alluxa.com/optical-filter-specs/surface-flatness-and-wavefront-error, downloaded Mar. 13, 2023, 7 pages.

* cited by examiner

MICROFLUIDIC DEVICES AND METHODS FOR MANUFACTURING MICROFLUIDIC DEVICES

CROSS-REFERENCE TO RELATED APPLICATIONS

This application claims the benefit of priority under 35 U.S.C. § 371 of International Application No. PCT/US2019/028633, filed on Apr. 23, 2019, which claims the benefit of priority under 35 U.S.C. § 119 of U.S. Provisional Application No. 62/664,000, filed Apr. 27, 2018, the content of each of which is incorporated herein by reference in its entirety.

BACKGROUND

1. Field

This disclosure relates to microfluidic devices and methods for manufacturing microfluidic devices.

2. Technical Background

Microfluidic devices may be useful for a variety of applications including bio-analysis (e.g., nucleic acid sequencing, single molecule analysis, etc.). In one example, the analysis is conducted by employing high resolution fluorescence imaging techniques to identify and quantify specific molecules at a surface of a substrate that is exposed to the microfluidic channel of the device. For instance, in optical detection based parallel gene sequencing techniques, millions of DNA fragments generated from a genomic DNA sample may be immobilized and partitioned onto the substrate surface of the microfluidic device such that the fragments are spatially separated from each other to facilitate sequencing by, for example, synthesis, ligation, or single-molecule real-time imaging.

Conventional bio-analysis techniques employing these nucleic acid sequencing and single molecule assays often suffer from prolonged collection times for collecting thousands of images to achieve adequate identification and quantification. The present application discloses improved microfluidic devices and methods for manufacturing microfluidic devices, which can aid in reduced image collection times.

SUMMARY

In some embodiments, a microfluidic device includes a glass substrate comprising a first glass layer and a second glass layer fused to the first glass layer; a flow channel disposed in the glass substrate; and a cover bonded to the glass substrate and at least partially covering the flow channel.

The microfluidic device can include an inlet opening through at least one of the glass substrate or the cover and in fluid communication with the flow channel; and an outlet opening through at least one of the glass substrate or the cover and in fluid communication with the flow channel.

At least one of a floor or a ceiling of the flow channel can have an average surface flatness of at most about 100 nm/mm, measured in a longitudinal direction at a central portion of the flow channel.

Each of the floor and the ceiling of the flow channel can have the average surface flatness of at most about 100 nm/mm, measured in the longitudinal direction at the central portion of the flow channel.

At least one of a floor or a ceiling of the flow channel can have a surface flatness variance of at most about 3 µm along a length of the flow channel, measured at a central portion of the flow channel.

Each of the floor and the ceiling of the flow channel can have the surface flatness variance of at most about 3 µm along the length of the flow channel, measured at the central portion of the flow channel.

Each of a floor and a ceiling of the channel can have a surface roughness of at most about 10 nm.

In some embodiments, the glass substrate comprises a first glass layer and a second glass layer fused on the first glass layer. In some embodiments, the glass substrate comprises a first glass layer as a core layer, and a second and a third glass layer as cladding layers, each fused to one side of the first glass layer. In some embodiments, only one glass layer defines sidewalls of the flow channel, while a surface of the first glass layer defines a floor of the flow channel.

The first glass layer can define a floor of the flow channel; the second glass layer can define sidewalls of the flow channel; and the cover can define a ceiling of the flow channel. In some embodiments, the first glass layer defines a floor of the flow channel; the second glass layer and an adjacent portion of the first glass layer can define sidewalls of the flow channel; and the cover can define a ceiling of the flow channel.

The cover can be bonded to the glass substrate at a bonded volume comprising a bonding material diffused into each of the substrate and the cover.

The microfluidic device can include a bonding layer disposed between the glass substrate and the cover.

The bonding layer can comprise a metal.

The metal can comprise one or more of gold, chromium, titanium, nickel, copper, zinc, cerium, lead, iron, vanadium, manganese, magnesium, germanium, aluminum, tantalum, niobium, tin, indium, cobalt, tungsten, ytterbium, zirconium, or an oxide thereof, or a combination thereof. In some embodiments, the metal may comprise an alloy of the metals, or a metal oxide (e.g., indium tin oxide).

The bonding layer can comprise a polymer-carbon black composite film.

The flow channel can be formed in the second glass layer. In some embodiments, the flow channel can be formed in the second glass layer and adjacent a small portion of the first glass layer.

A width of the flow channel can be at most about 10 mm. In some embodiments, a width of the flow channel can be at most about 5 mm. In some embodiments, a width of the flow channel can be at most about 2 mm.

A height of the flow channel can be at most about 200 µm. In some embodiments, a height of the flow channel can be at most about 100 µm. In some embodiments, a height of the flow channel can be at most about 50 µm.

A length of the channel can be at least about 10 mm.

An interface between the first glass layer and the second glass layer of the substrate can be a glass-glass interface that is free of bonding material.

An auto-fluorescence in a wavelength range of 450 nm to 750 nm of each of the first glass layer and the cover is as low as quartz or pure silica substrate.

The microfluidic device can be a flow cell for DNA sequencing.

The microfluidic device can comprise a coating disposed within the flow channel. In some embodiments, the coating is disposed on the channel floor surface and/or channel ceiling surface to enable covalent attachment of a DNA molecule.

In some embodiments, a microfluidic device includes a glass substrate; a flow channel disposed in the glass substrate; and a cover bonded to the glass substrate and at least partially covering the flow channel, such that at least one of a floor or a ceiling of the flow channel has an average surface flatness of at most about 100 nm/mm, measured in a longitudinal direction at a central portion of the flow channel.

In some embodiments, a method for manufacturing a microfluidic device includes depositing a bonding layer on a surface of a second glass layer of a glass substrate comprising a first glass layer and the second glass layer fused to the first glass layer, whereby a masked region of the surface is covered by the bonding layer, and an exposed region of the surface is uncovered by the bonding layer; removing a portion of the second glass layer corresponding to the exposed region of the surface to form a flow channel in the glass substrate; and bonding a cover to the glass substrate with the bonding layer.

The removing the portion of the second glass layer can comprise contacting the exposed region of the surface with an etchant.

During the contacting the exposed region of the surface with the etchant, the bonding layer can serve as an etch mask to prevent contacting the masked region of the surface with the etchant.

The method can further comprise depositing a polymeric layer on the bonding layer to protect the bonding layer prior to the removing the portion of the second glass layer.

The etchant can comprise aqueous hydrofluoric acid with a concentration of at most about 5 weight percent HF.

The second glass layer can have a higher etch rate in the etchant than the first glass layer such that the first glass layer serves as an etch stop to control a depth of the flow channel.

The removing the portion of the second glass layer can comprise exposing a region of the first glass layer corresponding to the exposed region of the second glass layer to form the channel floor surface.

The bonding the cover to the glass substrate can comprise positioning the cover on the bonding layer and irradiating the bonding layer with electromagnetic radiation sufficient to diffuse at least a portion of the bonding layer into the cover and the glass substrate, thereby bonding the cover to the glass substrate.

The depositing the bonding layer on the surface of the second glass layer can comprise depositing the bonding layer by printing, tape bonding, or vapor deposition.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

Numerical values, including endpoints of ranges, can be expressed herein as approximations preceded by the term "about," "approximately," or the like. In such cases, other embodiments include the particular numerical values. Regardless of whether a numerical value is expressed as an approximation, two embodiments are included in this disclosure: one expressed as an approximation, and another not expressed as an approximation. It will be further understood that an endpoint of each range is significant both in relation to another endpoint, and independently of another endpoint.

The term "surface roughness" means Ra surface roughness determined as described in ISO 25178, Geometric Product Specifications (GPS)—Surface texture: areal, filtered at 25 μm unless otherwise indicated. The surface roughness values reported herein were obtained using a Zygo New View 3000.

The present disclosure provides methods to make and use glass-based microfluidic devices having ultra-flat surfaces and parallel ceiling and floor surfaces of their microfluidic channels. The microfluidic devices can be used, for example, for bio-analysis such as nucleic acid sequencing and single molecule assays.

FIGS. 1(A) to 1(D) depict a process flow 100 for the manufacture of a microfluidic device according to some embodiments.

Figure 1:
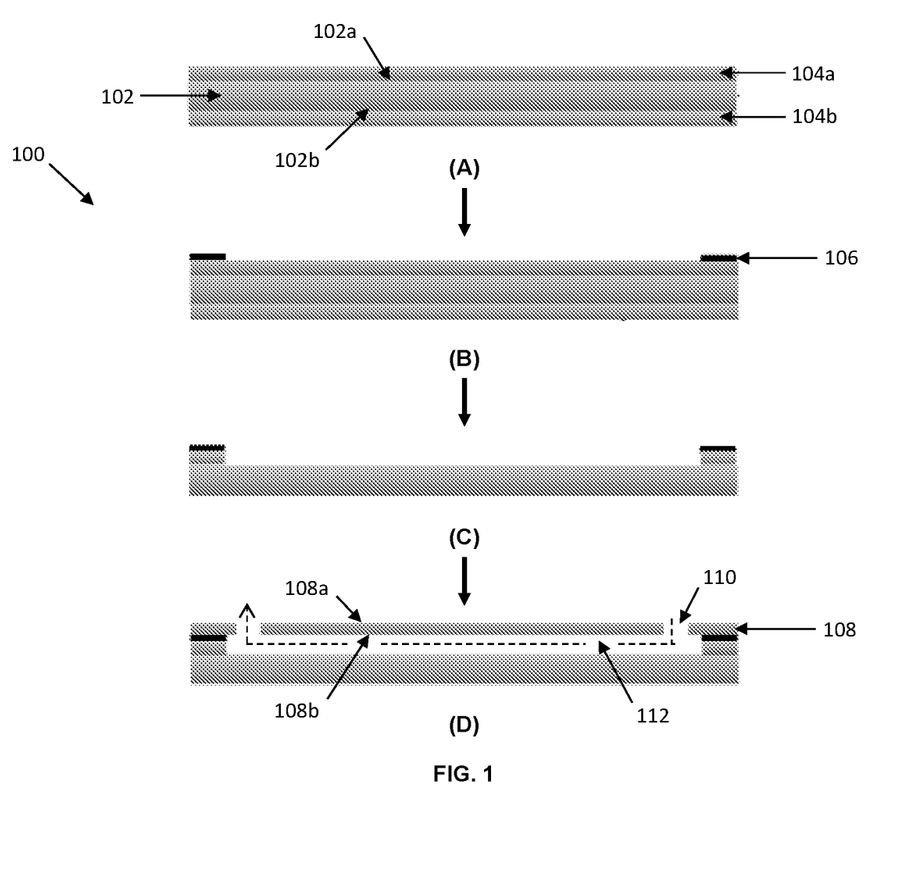
FIGS. 1(A) to 1(D) depict a process flow for the manufacture of a microfluidic device according to some embodiments.

In a first step as shown in FIG. 1(A), a three-layered substrate is provided comprising a core layer 102 interposed between a first cladding layer 104a and a second cladding layer 104b. The core layer 102, first cladding layer 104a, and second cladding layer 104b comprise, independently, glass-based materials (e.g., glass materials, glass-ceramic materials, ceramic materials, or combinations thereof). In some embodiments, the core layer 102 comprises a glass composition different from the glass composition of the first cladding layer 104a and the second cladding layer 104b. The first cladding layer 104a and the second cladding layer 104b may be formed from a first cladding glass composition and a second cladding glass composition, respectively. In some embodiments, the first cladding glass composition and the second cladding glass composition may be the same material. In other embodiments, the first cladding glass composition and the second cladding glass composition may be different materials.

FIG. 1(A) illustrates the core layer 102 having a first surface 102a and a second surface 102b opposed to the first surface 102a. A first cladding layer 104a is fused directly to the first surface 102a of the core layer 102 and a second cladding layer 104b is fused directly to the second surface 102b of the core layer 102. The glass cladding layers 104a and 104b may be fused to the core layer 102 without any additional materials, such as adhesives, polymer layers, coating layers or the like being disposed between the core layer 102 and the cladding layers 104a and 104b. Thus, in this instance, the first surface 102a of the core layer 102 is directly adjacent the first cladding layer 104a, and the second surface 102b of the core layer 102 is directly adjacent the second cladding layer 104b. In some embodiments, the core layer 102 and the glass cladding layers 104a and 104b are formed via a fusion lamination process (e.g., fusion draw process). Diffusive layers (not shown) may form between the core layer 102 and the cladding layer 104a, or between the core layer 102 and the cladding layer 104b, or both.

The first and second cladding layers may be formed from a composition comprising silicon dioxide ($SiO_2$) having a concentration in a range of 45 mol % to 60 mol %, alumina ($Al_2O_3$) having a concentration in a range of 8 mol % to 19 mol %, boron trioxide ($B_2O_3$) having a concentration in a range of 5 mol % to 23 mol %, and sodium oxide ($Na_2O$) having a concentration in a range of 3 mol % to 21 mol %. The cladding layers may be substantially free of arsenic (As) and cadmium (Cd) to provide that the degradation rate of the cladding layers is at least ten times greater than the degradation rate of the core layer.

The core layer may be formed from at least one of an alkaline earth boro-aluminosilicate glass (e.g., Corning Eagle XG®), Corning FotoForm® Glass, Corning Iris™ Glass, or Corning Gorilla® Glass. For example, the core layer may be formed from a glass having a composition of 79.3 wt. % $SiO_2$, 1.6 wt. % $Na_2O$, 3.3 wt. % $K_2O$, 0.9 wt. % $KNO_3$, 4.2 wt. % $Al_2O_3$, 1.0 wt. % ZnO, 0.0012 wt. % Au, 0.115 wt. % Ag, 0.015 wt. % $CeO_2$, 0.4 wt. % $Sb_2O_3$, and 9.4 wt. % $Li_2O$. In some embodiments, the core layer comprises at least one of Corning Eagle XG® Glass or Corning Iris™ Glass, for example, due to their ultra-low auto-fluorescence.

FIG. 1(B) illustrates a coating and patterning process whereby a glass-to-glass bonding material 106 (e.g., bonding layer) is deposited onto a surface of the first cladding layer 104a. For example, the glass-to-glass bonding material 106 comprises at least one of Cr/CrON, metals (e.g., Zn, Ti, Ce, Pb, Fe, Va, Cr, Mn, Mg, Ge, Au, Ni, Cu, Al, Ta, Nb, Sn, In, Co, W, Yb, Zr, etc.), metal oxides thereof (e.g., $Al_2O_3$, $ZnO_2$, $Ta_2O_5$, $Nb_2O_5$, $SnO_2$, MgO, indium tin oxide (ITO), $CeO_2$, CoO, $Co_3O_4$, $Cr_2O_3$, $Fe_2O_3$, $Fe_3O_4$, $In_2O_3$, $Mn_2O_3$, NiO, a-$TiO_2$ (anatase), r-$TiO_2$ (rutile), $WO_3$, $Y_2O_3$, $ZrO_2$), or polymer-carbon black composite films (e.g., polyimide-carbon black film).

The composite structure of FIG. 1(B) may be formed using at least one of spin-coating, dip coating, chemical vapor deposition (CVD) (e.g., plasma-assisted, atomic layer deposition (ALD), vapor-phase epitaxy (VPE), etc.), physical vapor deposition (PVD) (e.g., sputter, evaporative, e-beam, etc.), laser-assisted deposition, etc.

FIG. 1(C) illustrates a wet chemical etching process whereby, after patterning the glass-to-glass bonding material 106 (as shown in FIG. 1(B)), the three-layered glass substrate is subject to selective chemical etching to remove a portion of the first cladding layer 104a not protected by the patterned glass-to-glass bonding material 106 (e.g., the portion of the first cladding layer 104a that is uncovered by the glass-to-glass bonding material 106) until the core glass layer 102 is exposed and its surface becomes one surface of a microfluidic channel (e.g., for the immobilization of biomolecules). Additionally, or alternatively, the wet chemical etching process can remove the second cladding layer 104b as shown in FIGS. 1(B) and 1(C). In the wet chemical etching process, the patterned glass-to-glass bonding material 106 serves as an etch mask to prevent contacting the masked region of the first cladding layer 104a with the etchant. The first cladding layer 104a and the second cladding layer 104b may have an etch rate in the etchant that is higher than the etch rate of the core glass layer 102 such that the core glass layer 102 serves as an etch stop to control a depth of the microfluidic channel. In some embodiments, a polymeric layer is deposited on the glass-to-glass bonding material 106 prior to the wet chemical etching process (e.g., to further increase the resistance of the glass-to-glass bonding material 106 to the etchant).

Alternatively, an etchant resist polymer sheet may be formed on the etchant contact surface of the second cladding layer 104b and/or a region of the first cladding layer 104a containing the patterned glass-to-glass bonding material 106 prior to etching such that post-etching, the second cladding layer 104b remains intact while the exposed region of the first cladding layer 104a is removed to form the channel.

Patterning of the glass-to-glass bonding material 106 may be conducted using either additive or subtractive patterning techniques (e.g., ink printing, tape bonding, vapor deposition, plasma etching, wet etching, etc.).

The wet etching chemical comprises a suitable component capable of degrading or dissolving the glass article or a portion thereof as described herein. For example, the suitable wet etching chemical includes an acid (e.g., HCl, $HNO_3$, $H_2SO_4$, $H_3PO_4$, $H_3BO_3$, HBr, $HClO_4$, HF, acetic acid), a base (e.g., LiOH, NaOH, KOH, RbOH, CsOH, $Ca(OH)_2$, $Sr(OH)_2$, $Ba(OH)_2$), or a combination thereof.

Figure 2:
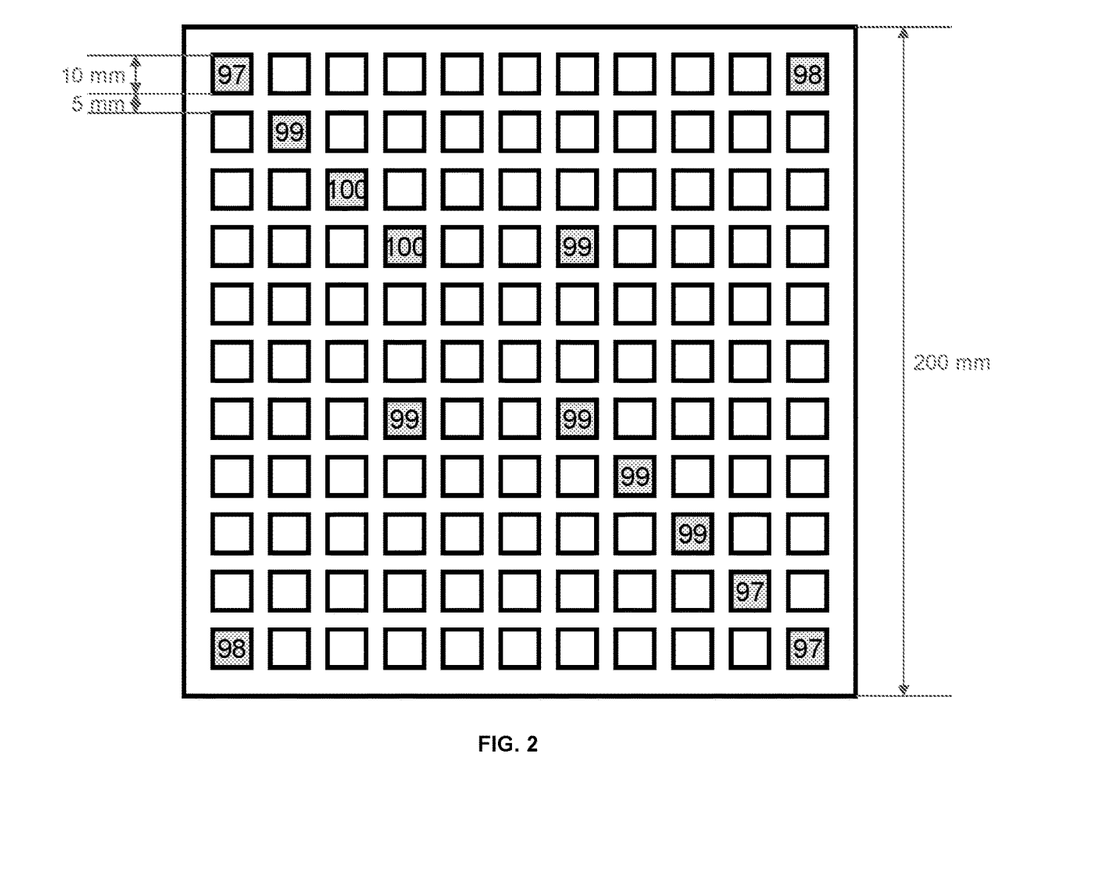
FIG. 2 illustrates mean cavity depth values of a three-layered glass substrate post wet chemical etching according to some embodiments.

FIG. 2 illustrates mean cavity depth values of a three-layered glass substrate post wet chemical etching according to some embodiments. In this example, a 200 mm×200 mm glass substrate panel was washed using a 4% semi-clean detergent and rinsed with 18 Mohm deionized (DI) water. High-purity inert gas (e.g., $N_2$) may be used to eliminate residual water droplets remaining on the glass substrate and the panel may be stored in a desiccator for 24-48 hours to ensure dryness. After application and patterning of the glass-to-glass bonding material (e.g., ink materials containing acrylic and carbon black were applied on the cleaned glass using an inkjet printing technique and then cured under UV light), the panel was soaked in a 2 wt. % HF solution to initiate etching. Agitation (e.g., manual, sonication, etc.) may be used during the etching process. One hundred microns of glass materials were removed using this chemistry at 22° C. for 70 min. Other etching conditions may also be contemplated to complete the etch process (e.g., 2 wt. % HF at 35° C., see Table 1). In some embodiments, the etchant comprises aqueous hydrofluoric acid (HF) with a concentration of at most about 5 wt. % HF. The surface measurement and characterization of the substrate's microscale surface features (e.g., "Z-height") was measured using a three-dimensional optical surface profiler (e.g., Zygo New View 3000 or Z-mapper laser interferometer). For each measured 10 mm×10 mm cavity (indicated by a numerical value), measurements were acquired on multiple positions within the cavity and averaged to determine the average removal depth within the cavity (units in μm). The target removal depth is 100 μm.

As is shown, over the entire 200 mm×200 mm panel, there is no more than about 3% difference between the etching depth of the cavities having complete removal (100 μm) and nearly complete removal (97 μm). Thus, the resultant surface is ultra-flat (e.g., due to the controlled nature of the chemical wet etching process). The etch-stop effect of the core glass layer enables precision control of z-height (uniformity of $Z_{location\ 1}$ and $Z_{location\ 2}$), flatness of the cavity (low ΔZ) and surface roughness ($R_a$) to ensure a high-quality cavity floor and enable precision microfluidic channels for large-size glass substrates by wet etching (see Table 1).

TABLE 1

| Etchant | Etch time (min) | $Z_{location\ 1}$ (μm) | $Z_{location\ 2}$ (μm) | ΔZ ($|Z_{location\ 1} - Z_{location\ 2}|$) | Cavity floor surface roughness ($R_a$, nm) |
|---|---|---|---|---|---|
| 2 wt. % HF at 22° C. | 50 | 97 | 97 | 0.1 | 1.8 |
|  | 60 | 100 | 100 | 0.0 | 3.0 |
|  | 70 | 100 | 100 | 0.2 | 6.8 |
| 2 wt. % HF at 35° C. | 20 | 95 | 93 | 2.0 | 1.0 |
|  | 25 | 98 | 98 | 0.4 | 1.4 |
|  | 30 | 107 | 105 | 2.0 | 2.4 |

Figure 3:
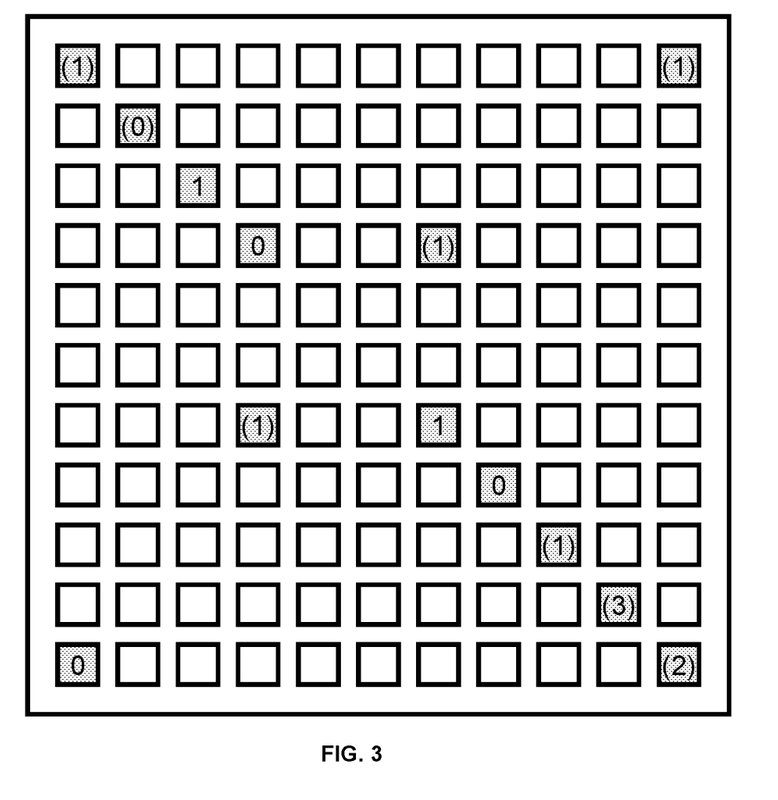
FIG. 3 illustrates flatness values of a three-layered glass substrate post wet chemical etching according to some embodiments.

FIG. 3 illustrates flatness values of a three-layered glass substrate post wet chemical etching according to some embodiments. Specifically, the data shows that the difference of the Z-height between any two points (amongst the multiple positions measured within the cavity) of the surface floor in that cavity is less than 3 μm. For example, a value of (1) in FIG. 3 reflects a difference of 1 μm between the Z-height measurement of a first location and the Z-height measurement of a second location, with both locations being in the same cavity. A value of (0) means that the Z-heights of both locations is roughly equal, as measured by the surface profiler. Thus, the process disclosed herein can enable ultra-flat, ultra-smooth, and highly pristine cavities over a large-scale glass substrate, which may be attributed to the etching stop layer at the cladding-core interface.

FIG. 1(D) represents the final assembly of the microfluidic device after application of a glass cover substrate 108 (having a first surface 108a and a second surface 108b) atop glass-to-glass bonding material 106. The glass cover substrate 108 comprises a glass-based material (e.g., glass materials, glass-ceramic materials, ceramic materials, or combinations thereof).

In some embodiments, a laser-assisted radiation bonding process was used to bond glass cover substrate 108 with first cladding layer 104a using glass-to-glass bonding material 106. Without being bound by any particular theory or process, it is thought that the bonding of the glass-to-glass bonding material 106 to the first cladding layer 104a and glass cover substrate 108, respectively, is the result of diffusing a portion of the glass-to-glass bonding material 106 into the first cladding layer 104a and into the glass cover substrate 108 such that each portion of the first cladding layer 104a and the glass cover substrate 108 comprising the diffused glass-to-glass bonding material 106 is the bonded volume layer (not shown). As oriented, the glass-to-glass bonding material 106 may not be transparent to the wavelength of the laser emission while the first cladding layer 104a and glass cover substrate 108 may be transparent to the wavelength of the laser emission. In such embodiments, the laser emission may pass through the glass cover substrate 108 and/or the three-layered substrate and be absorbed by the glass-to-glass bonding material 106. In some embodiments, the diffusion of the glass-to-glass bonding material 106 into the first cladding layer 104a and glass cover substrate 108, respectively, renders the bonded volume layer transparent to the wavelength of the laser emission.

In some embodiments, the bonding of the glass-to-glass bonding material 106 to the first cladding layer 104a and glass cover substrate 108, respectively, is accomplished using a laser which has a wavelength such that at least one of the substrates (e.g., first cladding layer 104a and/or glass cover substrate 108) is transparent to that wavelength. An interface between the layers provides a change in the index of transmission or optical transmissivity which results in absorption of laser energy at the interface and localized heating to create a bond.

In some embodiments, where the glass-to-glass bonding material 106 is Cr/CrON, the Cr component may function as a heat absorption layer which is opaque or blocking to the laser wavelength and has an affinity for diffusion into the first cladding layer 104a and/or the glass cover substrate 108. In alternative embodiments, other materials having appropriate wavelength absorption and diffusion affinity characteristics may be employed as the heat absorption layer. The thickness of the heat absorption layer may be as thick as desired to compensate for surface roughness or control timing and temperatures of the process.

Additionally, and/or alternatively, the bonding of the glass-to-glass bonding material 106 to the first cladding layer 104a and the glass cover substrate 108 throughout the bonded volume layer can include melting at least one of the glass-to-glass bonding material 106, first cladding layer 104a, and/or glass cover substrate 108 (e.g., localized melting at the site of laser emission absorption). Moreover, the bonding may also include fusing the glass-to-glass bonding material 106 to at least one of the first cladding layer 104a or glass cover substrate 108. In some embodiments, the bonded volume layer is transparent to the wavelength of the laser emission.

In some embodiments, the bonding can be achieved via separate laser emission (not illustrated) as described in U.S. Pat. Nos. 9,492,990, 9,515,286, and/or 9,120,287, the entirety of which are incorporated herein by reference.

In other words, after the glass cover substrate 108 is placed onto the etched structure of FIG. 1(C) (as described above) and is in close contact with the glass-to-glass bonding material 106, the combination is exposed to radiation (e.g., laser light treatment) to bond each of the first cladding layer 104a and the glass cover substrate 108 to glass-to-glass bonding material 106 through bonded volume layers, respectively. Creating the structure of FIG. 1(D) may include positioning the cover substrate 108 on the glass-to-glass bonding material 106 and irradiating the bonding material 106 with electromagnetic radiation sufficient to diffuse at least a portion of the bonding material 106 into the cover substrate 108 and the first cladding layer 104a.

As a result, the second surface 108b of the glass cover substrate 108 faces and is directly opposed to the first surface 102a of the core layer 102, with the second surface 108b being a ceiling surface of the microfluidic channel 112 and the first surface 102a being a floor surface. The ceiling surface 108b and floor surface 102a of the channel 112 may be highly parallel (e.g., due to precision bonding and ultra-flatness of the channel surfaces). Controlled entry and exit of a fluid (e.g., test DNA samples) can be conducted through holes 110 in the glass cover substrate 108 extending from the first surface 108a to the second surface 108b (e.g., through-holes). The microfluidic channel 112 provides a flow path (dashed line) for the fluid through the microfluidic device. For example, when used for DNA sequencing, the microfluidic channel 112 provides a flow path for test DNA samples such that DNA fragments may be immobilized and partitioned onto the ceiling surface 108b and/or the floor surface 102a of the channel 112 to facilitate sequencing. The ceiling surface 108b and/or the floor surface 102a of the channel 112 may be treated, for example, chemically functionalized or physically structured (e.g., with nanowell arrays), to aid in performing a desired function (e.g., capture of desired fragments).

In some embodiments, although the substrate is described as a three-layered substrate (see FIG. 1A)), a two-layered substrate is also contemplated and comprises a core glass layer and a cladding layer, as described above. In this instance, the wet chemical etching process of FIG. 1(C) would result in removal of a portion of the cladding layer not protected by the patterned glass-to-glass bonding material until the core glass layer is exposed. Thus, in this instance, the glass-to-glass bonding material is patterned atop the cladding layer.

Figure 4:
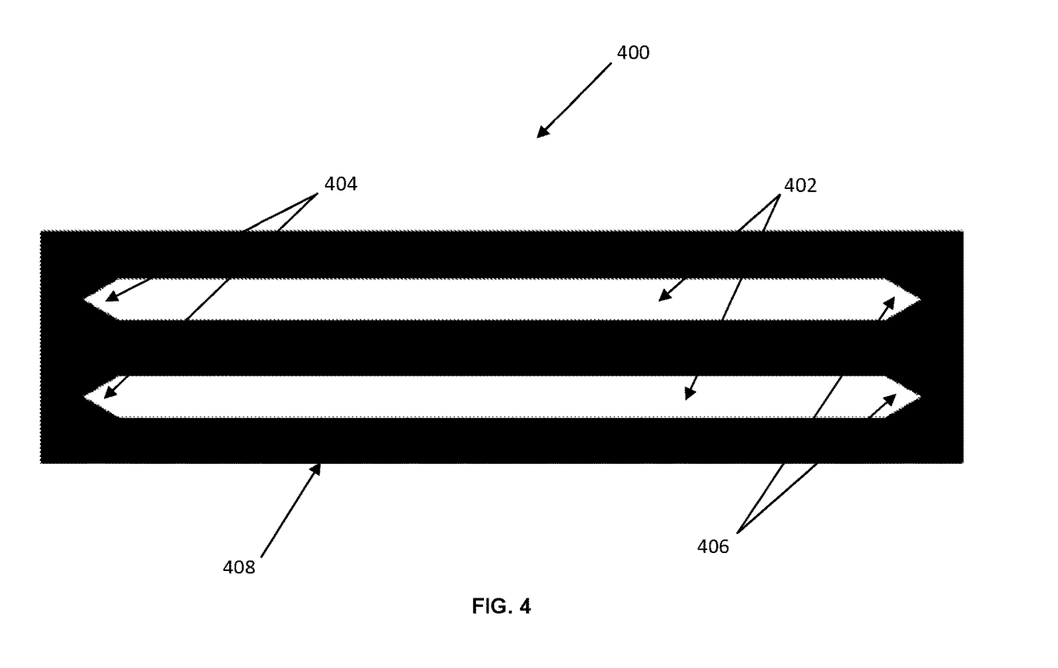
FIG. 4 is a plane view schematic drawing of a two-channeled microfluidic device according to some embodiments.

FIG. 4 is a plane view schematic drawing of a two-channeled microfluidic device 400 fabricated by the methods disclosed herein, according to some embodiments. In this example, the microfluidic device 400 includes a microfluidic channel 402 as a flow path for test samples connecting an inlet 404 and an outlet 406 for controlled entry and exit, respectively. In other words, each of the inlet 404 and the outlet 406 are in fluid communication with the microfluidic channel 402. As described above, the microfluidic channel 402 has a floor surface being a surface of the core layer 102, a ceiling surface being a surface of the glass cover substrate 108, and the first cladding layer 104a being at least a portion of the sidewalls of the microfluidic channel 402. The ceiling and floor surfaces of each channel 402 may be used for immobilizing biomolecules. Each individual channel may be separated with a bonding area 408 where the first cladding layer 104a and the glass cover substrate 108 are bonded with the glass-to-glass bonding material 106, as described above.

In some embodiments, at least one of a floor or a ceiling of the microfluidic channel has an average surface flatness of at most about 100 nm/mm, measured in a longitudinal direction at a central portion of the microfluidic channel. In some embodiments, at least one of a floor or a ceiling of the microfluidic channel has an average surface flatness of at most about 75 nm/mm, measured in a longitudinal direction at a central portion of the microfluidic channel.

In some embodiments, each of the floor and the ceiling of the microfluidic channel has the average surface flatness of at most about 100 nm/mm, measured in the longitudinal direction at the central portion of the microfluidic channel. In some embodiments, each of the floor and the ceiling of the microfluidic channel has an average surface flatness of at most about 75 nm/mm, measured in the longitudinal direction at the central portion of the microfluidic channel.

The surface flatness can be measured using a laser interferometer (e.g., Zygo New View 3000, Zygo Z-mapper, Tropel FlatMaster), which measure differences in shape and tilt between a test sample surface and reference surfaces of the interferometer. For etched channels, the flatness of the microfluidic channel floor surface is measured relative to a top surface of the glass-to-glass bonding material 106 or a reference substrate when the test sample is placed against the reference substrate. For bonded microfluidic devices or flow cells, the flatness of the microfluidic channel floor surface is measured relative to a surface of the reference substrate, such that the device or flow cell is placed atop the reference substrate.

Figure 5:
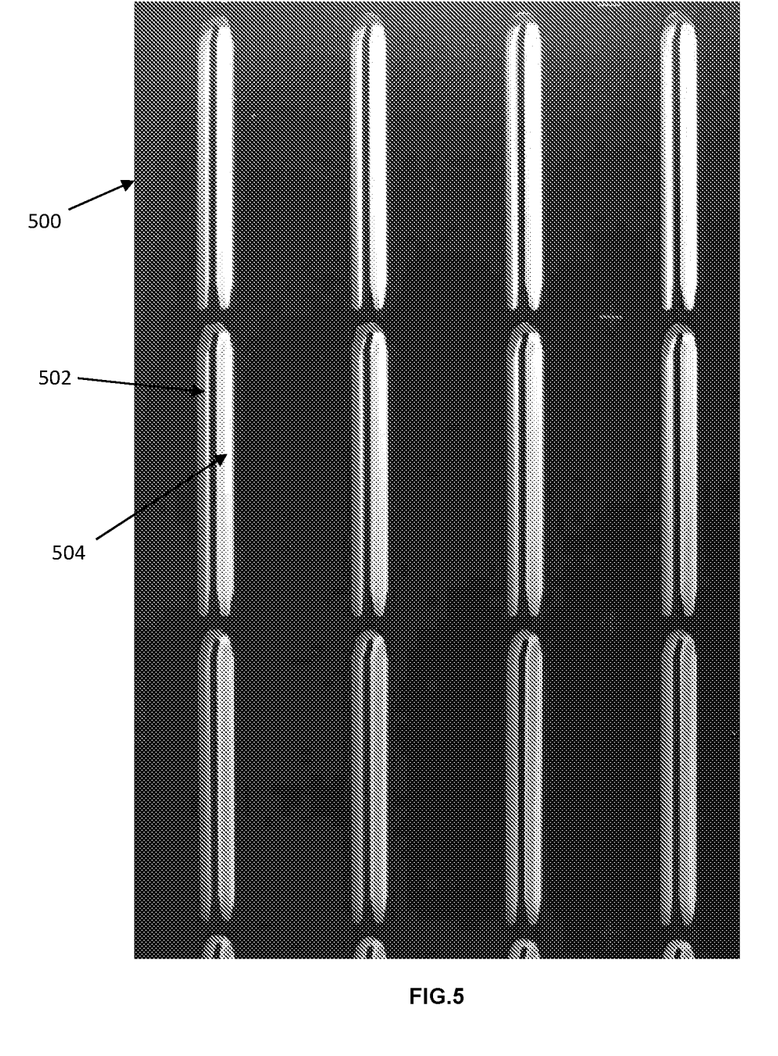
FIG. 5 illustrates a photograph of a portion of a three-layered glass substrate comprising 3×4 U-shaped fluidic channels according to some embodiments.

FIG. 5 illustrates a photograph of a portion of a 156 mm×156 mm three-layered glass substrate 500 comprising a 3×4 array of U-shaped fluidic channels made according to the methods presented herein. The left side 502 fluidic channel width is approximately 1.2 mm while the right side 504 fluidic channel width is about 1.7 mm of the U-shape channel. After an initial glass substrate 500 cleaning, Cr metal is coated thereon followed by photolithographic patterning to form a Cr mask. Thereafter, an HF-resistant polymer film is attached to and covers the second cladding layer, while a second HF-resistant polymer film having an identical pattern as the Cr mask is used to cover the Cr mask. Finally, the glass substrate 500 is exposed to a 2 wt. % HF solution for 70 min at room temperature while agitating (e.g., sonication). The image of FIG. 5 was obtained after washing and drying.

Figure 6:
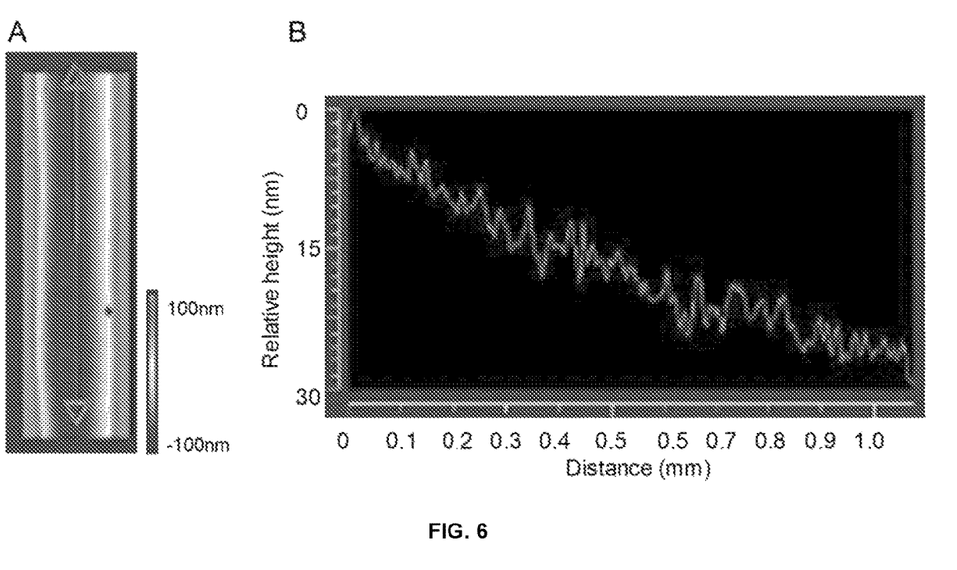
FIGS. 6(A) and 6(B) illustrate a laser interferometric image and data, respectively, showing (1) a height profile of a portion of the U-shaped fluidic channels of FIG. 5 and (2) the fluidic channel floor height variance as indicated in (1).

FIG. 6(A) illustrates a false-colored laser interferometric image of the height profile of a portion of the U-shaped fluidic channels of FIG. 5. FIG. 6(B) illustrates the channel floor height variance along the measurement line indicated in FIG. 6(A). Data was obtained using Zygo New View 3000. The height variance along the central portion of the channel floor is about 30 nm/mm.

In some embodiments, the etchant comprises a surfactant, which can enable improved flatness compared to use of an etchant without the surfactant. For example, a three-layered glass substrate with an etch mask applied to an outer surface thereof as described herein was exposed to an etchant comprising 2.5 mL of DelONIC LF-EP-40 surfactant, commercially available from DeForest Surfactants (Boca Raton, Fla., USA), in 2 L of 2 weight percent aqueous HF solution to form 3 channels in the cladding layer of the substrate. The wet etching was performed in a shaker with the bonding material (e.g., the etch mask) facing downward. The rotation speed was 45 rpm, and the etching was performed for 50 minutes at room temperature. A 3D image of the resulting channel structure was captured using confocal, and the flatness of the channel bottom was determined using Zygo New View 3000. The data collected from the three channels formed with the etchant comprising the surfactant and three comparative channels formed with the same etchant, except without the surfactant is shown in Table 2.

TABLE 2

| Sample | Surfactant | Channel Depth (μm) | Portion of Channel Bottom with Flatness <100 nm/mm (%) | Channel Bottom Ra Surface Roughness (nm) | Channel Bottom Flatness in X-direction (nm/mm) | Channel Bottom Flatness in Y-direction (nm/mm) |
|---|---|---|---|---|---|---|
| 1 | Yes | 101 ± 2 | 89 ± 2 | 20 ± 3.8 | 21 ± 11 | 73 ± 41 |
| 2 | Yes | 97 ± 2 | 91 ± 2 | 24 ± 1.6 | 19 ± 4 | 69 ± 13 |
| 3 | Yes | 101 ± 3 | 93 ± 2 | 16 ± 3 | 25 ± 15 | 65 ± 39 |
| 4 | No | 102 ± 3 | 93 ± 2 | 26 ± 3.6 | 89 ± 13 | 257 ± 25 |
| 5 | No | 100 ± 2 | 80 ± 11 | 31 ± 12 | 260 ± 41 | 97 ± 33 |
| 6 | No | 107 ± 3 | 85 ± 7 | 22 ± 3.3 | 64 ± 42 | 65 ± 21 |

The results illustrate that addition of the surfactant to the etchant reduced the average flatness of the channel bottom (in the longitudinal direction, or Y-direction) from about 140 nm/mm to about 69 nm/mm. Without wishing to be bound by any theory, it is believed that addition of the surfactant to the etchant facilitates diffusion of dissolved glass species from the glass surface into the bulk etchant solution, which can prevent etching products from depositing onto the glass surface, thereby improving flow channel flatness. Additionally, or alternatively, other surfactants that are chemically compatible with the other constituents of the etchant can be used.

In some embodiments, at least one of a floor or a ceiling of the microfluidic channel has a surface flatness variance of at most about 3 μm along a length of the entire microfluidic channel, measured at a central portion of the microfluidic channel (e.g., along the longitudinal centerline of the channel). In some embodiments, each of the floor and the ceiling of the microfluidic channel has the surface flatness variance of at most about 3 μm along the length of the microfluidic channel, measured at the central portion of the entire microfluidic channel. In some embodiments, each of a floor and a ceiling of the microfluidic channel has a surface roughness of at most about 10 nm. In some embodiments, a width of the fluidic channel is at most about 2 mm or is at most about 5 mm or is at most about 10 mm. In some embodiments, a height of the fluidic channel is at most about 50 μm, or is at most about 100 μm, or is at most about 200 μm. In some embodiments, a length of the channel is at least about 10 mm.

In some embodiments, an auto-fluorescence in a wavelength range of 450 nm to 750 nm of each of the core layer 102 and the cover substrate 108 is at least as low as the auto-fluorescence of one or both of a quartz substrate or a pure silica substrate.

Thus, as provided herein, a microfluidic device and method of manufacture thereof is described having ultra-flat surfaces and highly parallel ceiling and floor surfaces of its channels.

Conventional bio-analysis techniques employing these nucleic acid sequencing and single molecule assays often suffer from prolonged collection times for collecting thousands of images to achieve adequate identification and quantification. This is particularly a problem in gene sequencing, which often involves hundreds of sequencing cycles, each of which is imaged and analyzed. This may be due to a limited field of view for high resolution fluorescence microscopic imaging and the typical un-flatness of the channel floor surfaces. For example, in typical microfluidic devices whose channel floor surface is not adequately flat, scanning and collecting images from a large surface area requires adjustments to the focusing plane to achieve high sensitive imaging when scanning from one measurement area to the next. This is time consuming and in turn, increases the overall time required for sequencing.

In addition, due to the lack of adequate flatness of the channel floor surfaces, fluorescence artefacts may be introduced due to shadowing or light interference during high resolution fluorescence imaging. One way to minimize artefacts arising from flatness issues with the channel floor surface is to introduce tip-tilt correction functions in fluorescence imaging systems, which are also time consuming and increase the cost and complexity of optical detection instruments.

The microfluidic device disclosed herein may be used, in one application, for nucleic acid sequencing and single molecule assays. The physical features of the microfluidic device formed by the methods described herein (e.g., channels having ultra-flat surfaces and highly parallel ceiling and floor surfaces) enable fast imaging acquisition due to the minimal time required for re-positioning and re-focusing imaging objectives, and/or eliminating the need of tip-tilt correction. As a result, image collection times may be significantly decreased and imaging quality is improved, thereby yielding improvement in overall assay performance for identification and quantification of biomolecule fragments.

Additionally, the present application enables low cost in making microfluidic channels having coatings (e.g., amine reactive polymeric coatings), for example at least the floor and/or ceiling surface, for covalently coupling with DNA probe molecules via their 5'- or 3'-terminal, wherein the density of the attached probe molecules may be precisely controlled, thereby resulting in subsequent precise control of the hybridization amount of DNA fragments containing adaptor sequence(s) complementary to the probe DNA molecules, which in turn, leads to improved polyclonal clustering and sequencing efficiency. Compared with conventional non-flat surfaces, the use of ultra-flat surfaces enables calculation of exact surface area of the channel, so that the specific amount of DNA molecules required to achieve the best surface density may be determined and used to functionalize the surface.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:
1. A microfluidic device comprising:
   a glass-based substrate comprising a first glass-based layer and a second glass-based layer fused to the first glass-based layer;

a flow channel disposed in the glass-based substrate, the flow channel derived from exposure of the glass-based substrate to an acid- and surfactant-containing etchant; and a cover bonded to the second glass-based layer and at least partially covering the flow channel;

wherein a floor of the flow channel has an average surface flatness of at most about 100 nm/mm, as measured in a longitudinal direction at a central portion of a flow channel of a test sample with a laser interferometer and calculated from flatness data obtained from at least three respective flow channels of at least three separately formed test samples, each test sample being materially the same as the microfluidic device, wherein the first glass-based layer defines the floor of the flow channel, the second glass-based layer defines sidewalls of the flow channel and the cover defines a ceiling of the flow channel, wherein the second glass-based layer comprises an etch rate in the etchant that is higher than an etch rate of the first glass-based layer in the etchant, and further wherein the second glass-based layer has a composition comprising $SiO_2$ from 45 to 60 mol %, $Al_2O_3$ from 8 to 19 mol %, $B_2O_3$ from 5 to 23 mol %, and $Na_2O$ from 3 to 21 mol % and the first glass-based layer has a composition with more $SiO_2$ than the $SiO_2$ in the composition of the second glass-based layer.

2. The microfluidic device of claim 1, comprising:
an inlet opening through at least one of the glass-based substrate or the cover and in fluid communication with the flow channel; and
an outlet opening through at least one of the glass-based substrate or the cover and in fluid communication with the flow channel.

3. The microfluidic device of claim 1, wherein the floor of the flow channel has a surface flatness variance of at most about 3 µm along a length of the flow channel, as measured at a central portion of the flow channel.

4. The microfluidic device of claim 1, wherein the floor of the channel has a surface roughness (Ra) of at most about 10 nm, as measured according to ISO 25178, Geometric Product Specifications, with a laser interferometer.

5. The microfluidic device of claim 1, comprising a bonding layer disposed between the first glass-based layer and the cover, wherein the cover is bonded to the second glass-based layer at a bonded volume comprising the bonding layer diffused into each of the second glass-based layer and the cover.

6. The microfluidic device of claim 5, wherein the bonding layer comprises a metal.

7. The microfluidic device of claim 5, wherein the bonding layer comprises a polymer-carbon black composite film.

8. The microfluidic device of claim 1, wherein a length of the channel is at least about 10 mm.

9. The microfluidic device of claim 1, wherein an interface between the first glass-based layer and the second glass-based layer of the glass-based substrate is a glass-glass interface that is free of bonding material.

10. A microfluidic device comprising:
a glass-based substrate comprising a first glass-based layer and a second glass-based layer fused to the first glass-based layer;
a flow channel disposed in the glass-based substrate, the flow channel derived from exposure of the glass-based substrate to an acid- and surfactant-containing etchant; and
a cover bonded to the second glass-based layer and at least partially covering the flow channel,
wherein a floor of the flow channel has an average surface flatness of at most about 100 nm/mm, as measured in a longitudinal direction at a central portion of a flow channel of a test sample with a laser interferometer and calculated from flatness data obtained from at least three respective flow channels of at least three separately formed test samples, each test sample being materially the same as the microfluidic device,
wherein the first glass-based layer defines the floor of the flow channel, the second glass-based layer defines sidewalls of the flow channel and the cover defines a ceiling of the flow channel,
wherein the second glass-based layer comprises an etch rate in the etchant that is higher than an etch rate of the first glass-based layer in the etchant, and
further wherein the second glass-based layer has a composition comprising $SiO_2$ from 45 to 60 mol %, $Al_2O_3$ from 8 to 19 mol %, $B_2O_3$ from 5 to 23 mol %, and $Na_2O$ from 3 to 21 mol % and the first glass-based layer comprises a boro-aluminosilicate glass composition.

11. A microfluidic device comprising:
a glass-based substrate comprising a first glass-based layer and a second glass-based layer fused to the first glass-based layer;
a flow channel disposed in the glass-based substrate, the flow channel derived from exposure of the glass-based substrate to an acid- and surfactant-containing etchant; and
a cover bonded to the second glass-based layer and at least partially covering the flow channel,
wherein a floor of the flow channel has an average surface flatness of at most about 100 nm/mm, as measured and averaged in a longitudinal direction (Y-direction) at a central portion of the flow channel,
wherein the floor of the flow channel has an average surface flatness of at most about −30 nm/mm, as measured and averaged in a lateral direction (X-direction) at a central portion of the flow channel,
wherein the first glass-based layer defines the floor of the flow channel, the second glass-based layer defines sidewalls of the flow channel and the cover defines a ceiling of the flow channel,
wherein the second glass-based layer comprises an etch rate in the etchant that is higher than an etch rate of the first glass-based layer in the etchant, and
further wherein the second glass-based layer has a composition comprising $SiO_2$ from 45 to 60 mol %, $Al_2O_3$ from 8 to 19 mol %, $B_2O_3$ from 5 to 23 mol %, and $Na_2O$ from 3 to 21 mol % and the first glass-based layer comprises a boro-aluminosilicate glass composition.

\* \* \* \* \*

UNITED STATES PATENT AND TRADEMARK OFFICE
CERTIFICATE OF CORRECTION

PATENT NO. : 11,752,500 B2
APPLICATION NO. : 17/049676
DATED : September 12, 2023
INVENTOR(S) : Ye Fang et al.

It is certified that error appears in the above-identified patent and that said Letters Patent is hereby corrected as shown below:

On the Title Page

On the page 2, in Column 2, under "Other Publications", Line 20, delete "Chapters," and insert -- Chapter 5, --.

In the Claims

In Column 14, Line 44, in Claim 11, delete "–30" and insert -- 30 --.

Signed and Sealed this
Twenty-seventh Day of February, 2024

Katherine Kelly Vidal
*Director of the United States Patent and Trademark Office*